(12) United States Patent
Devine et al.

(10) Patent No.: US 10,880,691 B1
(45) Date of Patent: Dec. 29, 2020

(54) PASSIVELY CAPTURING AND MONITORING DEVICE BEHAVIORS

(71) Applicant: Root, Inc., Columbus, OH (US)

(72) Inventors: James Wilbert Devine, Columbus, OH (US); Daniel Craig Manges, Powell, OH (US)

(73) Assignee: Root, Inc., Columbus, OH (US)

( * ) Notice: Subject to any disclaimer, the term of this patent is extended or adjusted under 35 U.S.C. 154(b) by 0 days.

(21) Appl. No.: 16/669,952

(22) Filed: Oct. 31, 2019

(51) Int. Cl.
*H04W 4/02* (2018.01)
*B60W 40/09* (2012.01)
*H04W 4/029* (2018.01)

(52) U.S. Cl.
CPC ............ *H04W 4/027* (2013.01); *B60W 40/09* (2013.01); *H04W 4/029* (2018.02)

(58) Field of Classification Search
CPC ...... H04W 4/027; H04W 4/029; B60W 40/09
See application file for complete search history.

(56) References Cited

U.S. PATENT DOCUMENTS

| | | | |
|---|---|---|---|
| 2013/0302758 A1* | 11/2013 | Wright | G07C 5/008 434/65 |
| 2017/0078418 A1* | 3/2017 | Pennanen | A61B 5/103 |
| 2017/0103467 A1* | 4/2017 | Biemer | B60W 10/30 |
| 2019/0208384 A1* | 7/2019 | Matus | H04W 4/40 |

\* cited by examiner

*Primary Examiner* — Marisol Figueroa
(74) *Attorney, Agent, or Firm* — Schwegman Lundberg & Woessner, P.A.

(57) ABSTRACT

A determination is made that a mobile device is associated with a reference activity of a user based on motion, orientation, rotational, magnetic field, and/or location data provided by sensors of the device. Activity data associated with the reference activity is obtained from the sensor-provided data. The activity data is recorded on the device for a configured period of time after which it is determined that the device is no longer performing the reference activity. The retained activity data for the reference activity is sent from the device to a network-based behavior analyzer when a network connection is available from the device. The network-based behavior analyzer derives user behaviors for the reference activity based on the activity data.

20 Claims, 4 Drawing Sheets

PASSIVELY CAPTURING AND MONITORING DEVICE BEHAVIORS

BACKGROUND

Nearly every individual has a mobile phone these days. Mobile phone usage is not just a phenomenon in the United States, as mobile phones are pervasively owned and operated world-wide. Moreover, it is highly probably that a vast majority of children and teenagers carry phones. Phones are as important to individuals as are wallets, purses, and jewelry. In fact, someone is more likely to have their phone on them, than they are to have photo identification, money, or credit cards. Some newer credit cards exist only in digital format that is accessible from one's phone, which is encouraging people to rely on their phones instead of carrying physical payment cards around with them when they travel. People do not leave home without their mobile phones and if they do, they are more likely than not to return home to retrieve their phones; rather than go anywhere without their phones.

Consequently, phones are now intimately tied to the lives of individuals and one would be hard pressed to find anyone out in public above the age of 12 to 14, without a phone (at least in the United States).

These phones are powerful computers with network connectivity to a plurality of different types of wireless networks. Phones also include high-quality cameras and a variety of integrated sensors. Unsurprisingly, mobile phones are now primarily operated by users for purposes other than voice-based communications (e.g., texting, social media, web-browsing, retail service-based applications, camera and video capturing, etc.).

Retailers have been primarily focused on understanding how a user is interacting with various resources (applications) on his/her phone. This can be based on tracking logs or reporting applications maintained by a retailer mobile application on the phone. Affirmative actions that are consciously taken by the user with respect to device resources are captured and tracked for purposes of understanding how the user is interacting with specific applications. The actions are analyzed and used by retailers to capture the user's attention in order to sell the user a product/service or to increase an amount of time that the user spends accessing a retailer's services through a retailer mobile application on the phone.

However, very little is known about activities of users when users are simply passively carrying their phones and not affirmatively taking some action with respect to a resource of their phones. This passive time probably accounts for the vast majority of a user's day and is the least understood and utilized in the industry.

DETAILED DESCRIPTION

In various embodiments, methods and a system for passively capturing and monitoring device behaviors are provided.

According to one aspect, a method for passively capturing and monitoring device behaviors is presented. An activity identifier is received from an Operating System (OS) service that corresponds or matches a reference (or predefined) activity associated with a device. Sensor data from a sensor of the device is obtained and recorded on the device. A time is set when the OS service reports a different activity identifier for the device that does not match the predefined activity. New sensor data is continuously recorded with the sensor data on the device until the timer expires and reported activity identifiers from the OS service remain unmatched to the predefined activity for a duration of the timer.

Figure 1:
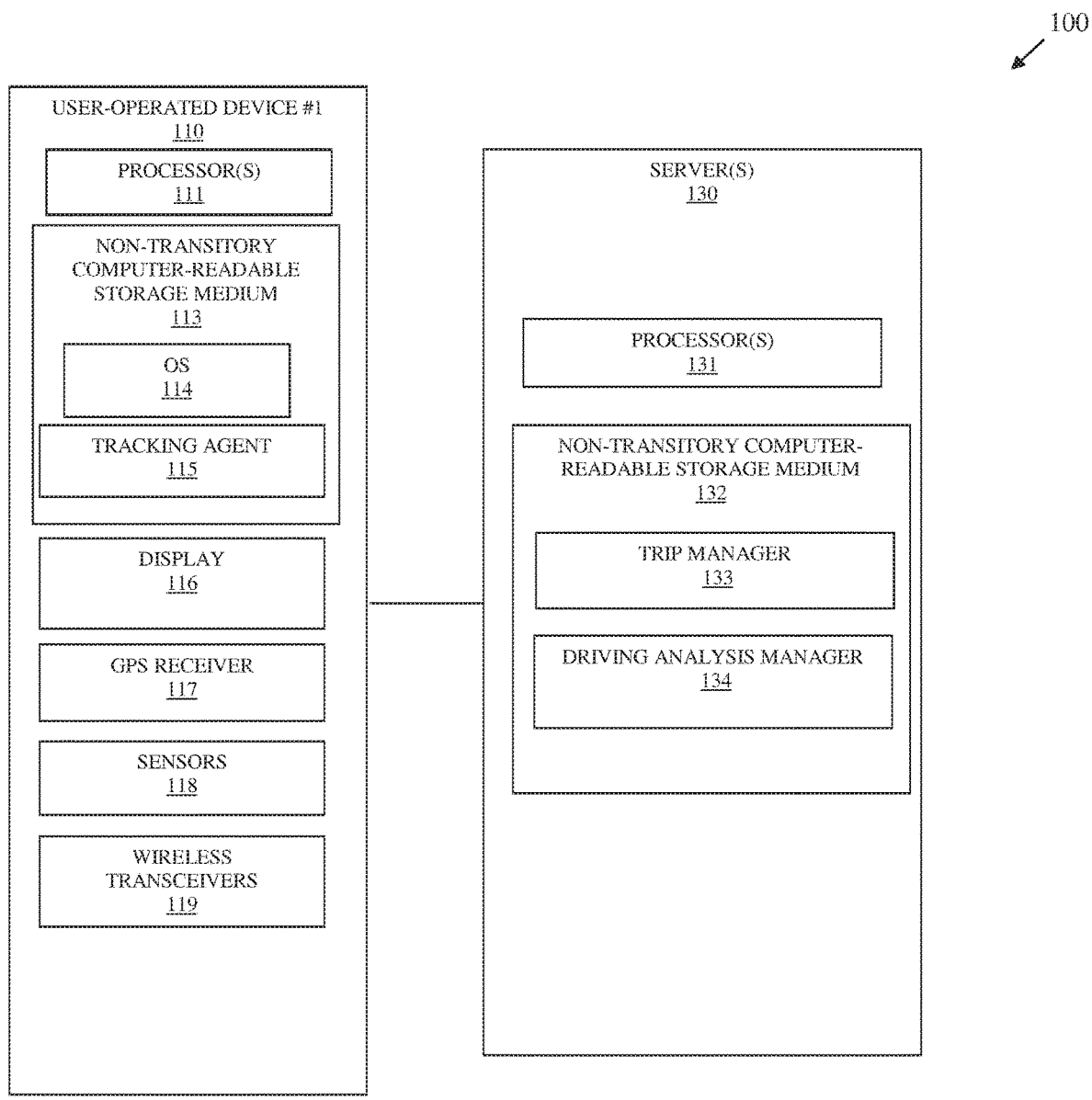
FIG. 1 is a diagram of a system for passively capturing and monitoring device behaviors, according to an example embodiment.

FIG. 1 is a diagram of a system 100 for passively capturing and monitoring device behaviors, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of passively capturing and monitoring device behaviors, presented herein and below.

As used herein and below, the terms "user," "consumer," "user," and "customer" may be used interchangeably and synonymously. The terms refer to an individual carrying a mobile device. The user can be actively operating the device, or the user may simply be in possession of the device where the device is: on the person of the user, within a purse/bag carried by the user, in a vehicle with the user, and/or in a holder/container of the vehicle with the user.

As will be discussed in detail below, the system 100 permits efficient tracking of movements/motions/orientations of a mobile device 110 of a user. The tracking of movement/motion/orientation is used to identify/infer when the user of the device 110 is performing an activity (based on device characteristics), such as through: walking, running, driving, riding a bicycle, flying, boating, etc. Of particular note, the system 100 permits a determination or an inference to be made regarding driving habits of a user while the user is driving a car. This is done through evaluation of data collected from Global Positioning Satellite (GPS) receiver 117 and sensors 118 and then deriving/inferring the user's driving behaviors and/or habits based on that evaluation of travel (movement/motion/orientation) and sensor data collected on the device 110.

Conventionally, driving habits require a peripheral On-Board Diagnostic (OBD) device, which must be plugged into a car's OBD port for purposes of collecting car data directly from an on-board computer system of the car. The peripheral device may then wireless communicate with the user's mobile device to provide the diagnostic data to a mobile application and uploaded to an insurance agency's network-service. Alternatively, the peripheral device may require that the user mail the peripheral device to the insurer for evaluation. This convention approach is changed with the teachings presented herein and below, such that no OBD device is needed to determine and resolve driving habits of a driver.

Notably, system 100 provides accurate driving diagnostic without usage of any peripheral device inserted into a car's OBD port and without requiring such peripheral device to interface with the mobile device 110 and/or be mailed in for subsequent evaluation. Furthermore, the capturing of GPS and sensor data is filtered for noise and only retained once a determination is made that the device 110 is associated with a user activity for driving, such that the amount of retained data is limited making evaluation more accurate while at the same time saving on battery power associated with device 110. Furthermore, a single driving trip is identified even when the device 110 indicates that driving is not taking place, such as when the device 110 is stopped in traffic during a trip, stopped at alight during the trip, or pulled over temporarily during the trip.

The system 100 includes a mobile device 110 and a server 130. Device 110 includes one or more processors 111 and non-transitory computer-readable storage medium 113 comprising executable instructions representing an Operating System (OS) 114 and a novel transaction agent 115. Device 110 also includes a display 116, a GPS receiver 117, sensors 118, and wireless transceiver 119.

Server 130 includes one or more processors 131 and non-transitory computer-readable storage medium 132 comprising executable instructions representing a trip manager 133 and a driving analysis manager 134.

During operation, tracking agent 115 selectively activates to record travel data (data being reported from GPS receiver 117 and/or sensors 118). That is, tracking agent 115 is debounced and only wakes up upon a signal change in location being received from GPS receiver 117 and/or sensors 118. Once activated or awoken, tracking agent 115 determines if the travel data indicates that the device 110 is with a user and traveling in a car. If it is determined the user is driving (based entirely on device travel data), tracking agent 115 is forced to stay active and record the trip associated with the driving. Furthermore, once it is determined from the travel data that the user is not driving based on continual evaluation of changes in location received from GPS receiver 117 and/or sensors 118, tracking agent 115 does not just stop recording when it appears the driving has stopped; rather, a configured period of time after a determination that the driving has stopped is recorded to ensure the trip is not abruptly ended without full capturing of the trip. In this way, noise produced from the GPS receiver data and sensor data is removed because tracking agent 115 only wakes up on a location change for device 110 and only starts full recording after a determination is made that the device 110 is with a user that is driving a car, and the full trip data is captured by fully recording the trip and capturing data after the trip (such until the user exits the car/vehicle). This saves on battery power of device 110 because tracking agent 115 is only fully scanning and recording travel data during a trip associated with the user driving a car and is debounced during periods where the user is not driving the car.

Furthermore, no network connection is needed while the travel data is being recorded, the travel data may be sent over a wireless connection once a wireless connection becomes available on device 110 to trip manager 133. Even when a user purposefully places his/her device 110 into an airplane mode or do not disturb mode of operation, GPS receiver 117 and sensors 118 are still active and gathering travel data. Trip manager 133 may provide the trip data to a driving analysis manager 134. Driving analysis manager 134 analyzes travel data in a trip for the user/driver to identify driving behaviors of the user as experienced by the device 110 in the travel data.

In an embodiment, determinations as to whether the device 110 is within a vehicle that is being driven is obtained from native OS 114 activity-based services by travel agent 115 through an Application Programming Interface (API) for accessing the OS services. In an embodiment, when the OS 114 is IOS® based, the service is CMMotionActivityManager. In an embodiment, when the OS 114 is Android® based, the service is the Activity Recognition API. The OS services are continually receiving and evaluating the GPS receiver data and/or sensor data from GPS receiver 117 and/or sensors 118. Tracking agent 115 registers with the OS services to receive a notification or an alert upon determination that device 110 is detected as moving for an indication that the user of the device is within a vehicle and driving that vehicle. Tracking agent 115 is not actively scanning or recording any travel data until the alert is received. The OS services continually evaluate the GPS receiver data and/or sensor data (travel data) and sends the alert to tracking agent 115 when the device 110 is associated with being driving a vehicle.

Once tracking agent 115 determines that device 110 is being driven within a vehicle, tracking agent 115 begins actively obtaining from the OS services the travel data (GPS receiver data and sensor data). The travel data is written or stored on device 110. It is noted that the travel data is selective data obtained from the GPS receiver 117 and the sensors 118; that is, not all of the various GPS receiver data and sensor data is recorded on device 110.

In an embodiment, where the OS 114 is Android® based, the sensors 118 include a location sensor, a linear acceleration sensor, a gravity sensor, a magnetic field sensor, and a gyroscope, In an embodiment, where the OS is IOS® based, the sensors 118 include a location sensor, an acceleration sensor, an altitude sensor, a gravity sensor, a rotation sensor, and a magnetic field sensor.

The GPS receiver data and the sensor data includes fields or attributes identifying different characteristics detected by the GPS receiver 117 and the sensors 118. Tracking agent 115 selectively scans the attributes and records selective attribute values returned by the GPS receiver 117 and sensors 118. For example, the GPS receiver data is scanned for attributes associated with: a location accuracy value, x, y, and z coordinates, latitude coordinates, longitudinal coordinates, GPS feed used (satellite(s) identifier(s)). The sensor data is scanned for attributes associated with: acceleration values, gravity values, magnetic field values, orientation values, rotational values, and altitude values. It is noted that these attributes associated with device 110 while device 110 is believed to be traveling (being driven within a vehicle) and the device's orientation, rotation, acceleration, altitude, etc. are used as examples as other attributes associated with motion and orientation of the device 110 may also be captured and recorded by tracking agent 115.

Once tracking agent 115 is actively recording a driving trip and storing the travel data on device 110, tracking agent is continuously checking to determine whether the device 110 is still being driven or has stopped being driven. This can be done through checking with the OS services.

However, because a driver/user in possession of device 110 may be stopped at a red light, stuck in a traffic jam, or pulled over, tracking agent 115 does not end the driving trip and does not stop recording the travel data immediately upon notification from the OS services that the device 110 is not being driven. Rather, a configured value associated with tracking agent 115 may be set for and processed by tracking agent 115 as a length or period of time during which tracking agent 115 continues recording travel data for the driving trip (a timer may be set upon first determination that the device is no longer associated with being driven). This ensures that tracking agent 115 does not identify and process multiple separate driving trips for device 110 and maintains all relevant travel data within a single driving trip. This also ensures that movement (orientation, rotations of device 110) data associated with periods where it appears the device 110 is stopped and not traveling are included with periods during which the device 110 is detected as traveling for a same single driving trip. Such that, if user/driver is operating device 110 (texting, browsing, talking) during periods when the device is not driving, such operational data of the device 110 can be captured and evaluated for a single driving trip. It is to be noted that the content associated with texting, browsing, or talking is never captured and is not needed; rather, these activities are inferred based on movement profiles and metrics for how the device is being handled.

In this way, tracking agent 115 ensures that all relevant travel data is included as a single trip, which allows driving analysis manager 134 to more accurately derive driving behaviors for the driver/user. So, not only can driving behaviors of the user/driver be identified (sharp turns, abrupt stops, excessive speeds, excessive acceleration, etc.) but behaviors associated with operating device 110 while driving can be identified (device texting, device talking, device browsing, and/or device viewing).

In an embodiment, tracking agent 115 passively monitors activities returned for the device 110 as provided by the OS services. Only when the activity indicates that the device 110 is being driven (not bicycling, walking, running) does tracking agent 115 start scanning and recording travel data. A timer is set as soon as the OS services report that the activity is no longer associated with driving and as long as the OS services do not report an activity for driving during the entire period of the timer, tracking agent 115 continues capturing the travel data for the driving trip. If the timer expires and during the entire timer period there was no activity reported as being associated with the device 110 being driven, tracking agent 115 concludes the driving trip.

Once tracking agent 115 has determined that a single driving trip with device 110 has ended (concluded), the recorded travel data may be sent to trip manager 133.

In an embodiment, the travel data is compressed before being sent to trip manager 133 over a wireless network connection between device 110 and server 130. The travel data can be optionally sent based on different configurable conditions or factors to the server 130. For example, travel data is sent as soon as a trip associated with that travel data successfully completes, when the trip indicates completion and such trip failed to send successfully to server 130 after a second trip was captured and successfully sent to server 130 (detecting that the failed trip was not received for lack of a wireless network connection after it completed, and other situations as discussed below.

In an embodiment, tracking agent 115 retains the travel data as a single unique driving trip and sends the travel data associated with that single driving trip with other retained travel data for other recorded trips at a preconfigured interval of time; for example, once a day tracking agent 115 sends multiple driving trips at one time to trip manager 133.

In an embodiment, when device 110 lacks a network connection (via a wireless transceiver 119), tracking agent 115 sends the travel data associated with the single driving trip when a next trip and its travel data is successfully sent indicating that the unsent travel data for a prior trip was missed because there was a lack of wireless connectivity at the end of the prior trip. In some cases, the travel data is sent as soon as a connection is available on device 110 (this may include multiple sets of travel data for multiple, independent, and separate driving trips that were recorded while the device 110 was offline and without a network connection, which could be when user/driver purposefully turned off transceiver 119, such as when device 110 is placed in airplane mode or do not disturb mode).

In an embodiment, tracking agent 115 provides, with each set of travel data associated with each unique and single driving trip, an OS type value, which identifies the type of OS 114 associated with device 110. The OS type permits trip manager 133 and/or driving analysis manager 134 to identify the attributes/fields provided in the travel data based on the OS services that made the GPS receiver data and sensor data available to tracking agent 115. For example, IOS® travel data may include different attributes/fields and types of GPS/sensor data from that which is included in Android®.

In an embodiment, tracking agent 115 obtains metadata for each driving trip as: a first location (geographical coordinates) from the travel data, timestamps, configuration data (motion capture rate, tracking agent version number, device identifier, and OS version), and file location for the driving trip on device 110. The metadata is provided with the travel data to trip manager 133.

Trip manager 133 optionally receives the travel data and/or metadata and may perform preprocessing on the travel data to normalize the travel data across OS types, assign a user/driver identifier associated with a user/driver account, assign a unique driving trip identifier for the user/driver account, and the like. Trip manager 133 provides the enhanced and/or normalized travel data to driving analysis manager 134.

Driving analysis manager 134 evaluates the trip data to identify details associated with the driving trip, such as length of trip, time of day of trip, calendar day of trip, roads traveled during the trip (based on cartographic data associated with the longitude and latitude coordinates present in the travel data etc.) Driving analysis manager 134 also calculates metrics for the trip based on pre-configured thresholds for such things as (by way of example only and not limited to): a total number of sharp turns, a total number of abnormally abrupt stops, number of times a swerve was detected that exceeds a predefined threshold speed (based on configured rotational or orientational changes noted for device 110), number of times acceleration exceeded a threshold value during the trip, amount of time device 110 was operated by the user/driver while driving and/or while being stopped during the trip, and others. The metrics are then used to assign values to driving behaviors based on predefined scales, such behaviors can include (by way of example only and not limited to): abrupt stops, swerving, sharp turns, excessive accelerations, operating device 110 by the user while driving, operating device 110 while stopped during the trip, etc.

In an embodiment, the driving behaviors assigned by the driving analysis manager 134 are provided as one of several inputs to an insurance network-based service for a driver account associated with the user/driver. The insurance network-based service tabulates the values assigned based on the scales for the behaviors of the user/driver for a configured number of driving trips and/or over a configured period of time (e.g., such as a month, two months, a year, etc.). The insurance network-based service uses the values for the behaviors over the configured number of trips or period of time along with other inputted factors associated with the user/driver known for the driver (such as but not limited to: age of driver, sex of driver, driving history, driver's license status, type of car, residence of driver, etc.) to provide a quote to the user/driver for providing different types of auto insurance to the user or to adjust new auto insurance rates for an existing insured driver for a new coverage period of auto insurance.

Tracking agent 115: passively executes in the background (e.g., without requiring any action of the user/driver and without requiring any input by user/driver) of device 110, awakens and actively scans the travel data and records the travel data when the device 110 is detected as being driven and, passively returns to a non-scanning and non-recording mode of operation (debounces) after a configured period of time during which the device 110 is not detected as being driven. This is processor efficient and reduces battery draw from device 110.

System 100 permits determination of driving trips based on characteristics of a mobile device 110 that accompanies a user/driver. A single driving trip is detected even when there are multiple starts and stops detected for motion and location data associated with the device 110. The trip data includes GPS receiver data and/or sensor data (motion and orientation data). Driving metrics for the trip are calculated and driving behaviors are assigned to the driver for the trip. This is achieved without any OBD peripheral device interfaced to the vehicle.

In an embodiment, device 110 is: a mobile phone, a tablet, or a wearable processing device.

In an embodiment, server 130 is one of a collection of servers 130 that cooperate in a cloud-based processing environment (cloud) of at least one server system.

The above-referenced embodiments and other embodiments are now discussed with reference to the FIGS. 2-4.

Figure 2:
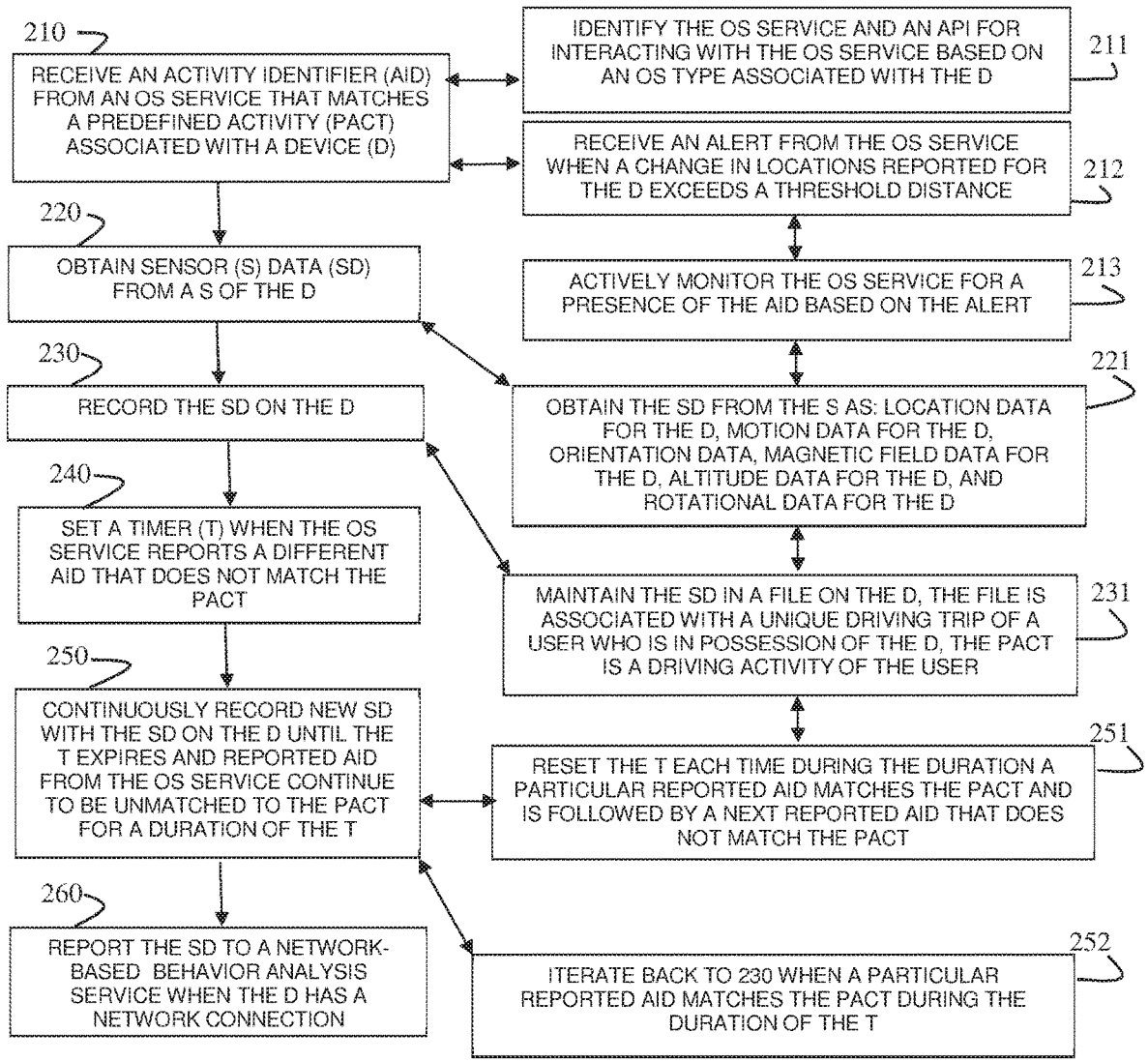
FIG. 2 is a diagram of a method for passively capturing and monitoring device behaviors, according to an example embodiment.

FIG. 2 is a diagram of a method 200 for passively capturing and monitoring device behaviors, according to an example embodiment. The software module(s) that implements the method 200 is referred to as a "device monitor." The device monitor is implemented as executable instructions programmed and residing within memory and/or a non-transitory computer-readable (processor-readable) storage medium and executed by one or more processors of a device. The processor(s) of the device that executes the device monitor are specifically configured and programmed to process the device monitor. The device monitor may have access to one or more network connections during its processing. The network connections can be wired, wireless, or a combination of wired and wireless.

In an embodiment, the device that executes the device monitor is device 110. In an embodiment, device 110 is a mobile phone, a tablet, or a wearable processing device.

In an embodiment, the device monitor is the tracking agent 115.

In an embodiment, the device monitor is a combination of OS activity services as discussed above and tracking agent 115.

At 210, the device monitor receives an activity identifier from an OS service that matches a predefined activity associated with the mobile device that executes the device monitor. The OS service can vary based on a type of OS associated with the mobile device. An API allows for retrieval or notification of the activity identifier. In an embodiment, the OS service is the Activity Recognition API when the OS is Android®. In an embodiment, the OS service is the CMMotionActivityManager when the OS is IOS®.

For example, and in an embodiment, at 211, the device monitor identifies the OS service and API for interacting with the OS service based on an OS-type associated with the mobile device.

In an embodiment, at 212, the device monitor receives an alert from the OS service when a change in locations reported from the mobile device exceeds a threshold distance.

In an embodiment of 212 and at 213, the device monitor actively monitors the OS service for a presence of the activity identifier based on the alert. That is, until the alert is received the device monitor does not actively check for activity identifiers with the OS service.

At 220, the device monitor obtains sensor data from sensors of the mobile device. This can be any of the above-noted sensors and types of sensor data discussed with the system 100.

In an embodiment of 213 and 220, at 221, the device monitor obtains the sensor data from the sensors as: location data for the mobile device, motion data for the mobile device, orientation data for the mobile device, magnetic field data for the device, altitude data for the mobile device, and rotational data for the mobile device.

At 230, the device monitor records the sensor data on the mobile device.

In an embodiment of 221 and 230, at 231, the device monitor maintains the sensor data in a file on the mobile device. The file is associated with a unique driving trip of a user who is in possession of the mobile device. The predefined activity is a driving activity and the file represent the entire driving trop for that driving activity.

At 240, the device monitor sets a timer when the OS service reports a different activity identifier that does not match the predefined activity.

At 250, the device monitor continuously records new sensor data with the sensor data on the mobile device until the timer expires and reported activity identifiers from the OS service continues to be unmatched to the predefined activity for a duration of the timer.

In an embodiment of 231 and 250, at 251, the device monitor resets the timer each time during the duration of the timer a particular reported activity identifier matches the predefined activity and is followed by a next reported activity identifier that does not match the predefined activity. That is, during the timer duration if one of the reported activities matches the predefined activity and any subsequent next reported activity identifier does not match the predefined activity, the timer is reset. The timer is removed if during the timer duration the predefined activity is reported by the OS service; however, the timer is re-established and reset whenever a reported activity fails to match the predefined activity.

In an embodiment, at 252, the device monitor iterates back to 230 when a particular reported activity identifier provided by the OS service matches the predefined activity during the duration of the timer. Essentially, the timer condition is removed if a reported activity from the OS service during the duration of the timer again matches the predefined activity.

According to an embodiment, at 260, the device monitor reports the sensor data to a network-based behavior analysis service when the mobile device has a network connection.

In an embodiment, the device monitor performs the processing 210-252 when the mobile device lacks a network connection and is in an airplane mode of operation or is in an area were a wireless transceiver 119 of the mobile device 110 is unable to obtain a wireless signal for connecting to a wireless network.

Figure 3:
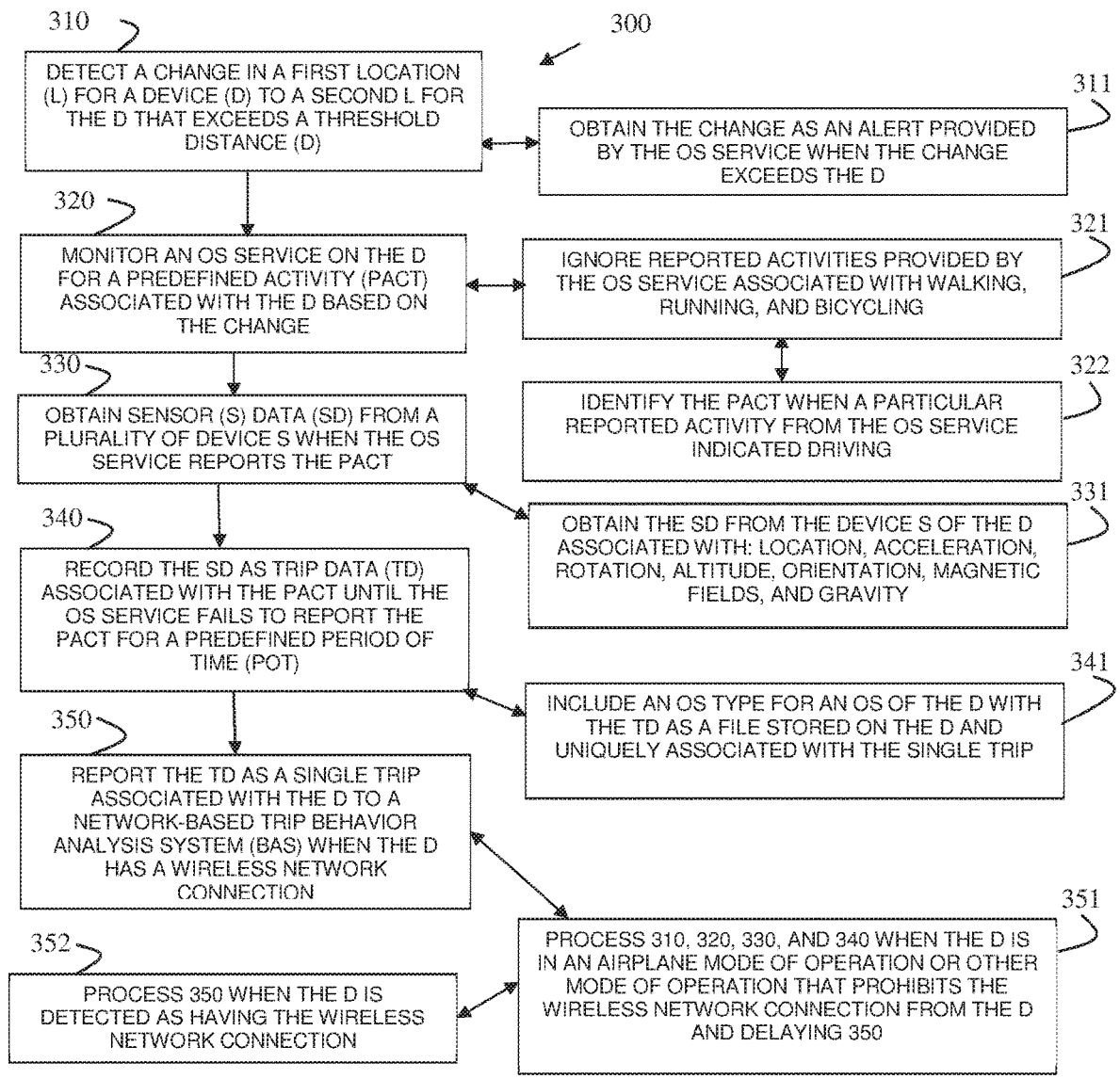
FIG. 3 is a diagram of a method for passively capturing and identifying when a device is traveling, according to an example embodiment.

FIG. 3 is a diagram of another method 300 for passively capturing and monitoring device behaviors, according to an example embodiment. The software module(s) that implements the method 300 is referred to as a "driving trip monitor." The driving trip monitor is implemented as executable instructions programmed and residing within memory and/or a non-transitory computer-readable (processor-readable) storage medium and executed by one or more processors of a device. The processors that execute the version compatibility manager are specifically configured and programmed to process the driving trip monitor. The driving trip monitor may have access to one or more network connections during its processing. The network connections can be wired, wireless, or a combination of wired and wireless.

In an embodiment, the device that execute the driving trip monitor is the device 110. In an embodiment, device 110 is a mobile phone, a tablet, or a wearable processing device.

In an embodiment, the driving trip monitor is all of, or some combination of: tracking agent 115 and/or the method 200.

The driving trip monitor presents another and, in some ways, enhanced processing perspective of the method 200.

At 310, the driving trip monitor detects a change in a first location for a mobile device to a second location for the mobile device when the change exceeds a threshold distance.

In an embodiment, at 311, the driving trip monitor obtains the change as an alert provided by the OS service (discussed below at 320) when the change exceeds the distance. In an embodiment, the distance for the change is approximately 300 meters.

At 320, the driving trip monitor monitors the OS service on the mobile device for a predefined activity associated with the mobile device based on the change.

In an embodiment, at 321, the driving trip monitor ignores reported activities for the device that are provided by the OS service when the activities are associated with: walking, running, and bicycling.

In an embodiment of 321 and at 322, the driving trip monitor identifies the predefined activity when a particular reported activity from the OS service indicates driving.

At 330, the driving trip monitor obtains sensor data from a plurality of device sensors when the OS service reports the predefined activity.

In an embodiment, at 331, the driving trip monitor obtains the sensor data from the device sensors, which are associated with: location, acceleration, rotation, altitude, orientation, magnetic fields, and gravity.

At 340, the driving trip monitor records the sensor data as trip data associated with the predefined activity until the OS service fails to report the predefined activity for a predefined period of time (e.g., a timer period).

In an embodiment, at 341, the driving trip monitor includes an OS type for an OS of the mobile device with the trip data as a file stored on the mobile device. The file uniquely associated with a single trip.

At 350, the driving trip monitor reports the trip data as a single trip associated with the mobile device to a network-based trip behavior analysis system when the mobile device has a wireless network connection.

In an embodiment, at 351, the driving trip monitor performs the processing of 310-340 when the mobile device is in an airplane mode of operation or other mode of operation that prohibits the wireless network connection from the mobile device. The driving trip monitor delays the processing of 350 associated with reporting.

In an embodiment of 351 and at 352, the driving trip monitor processes 350 and the reporting when the mobile device is detected as having the wireless network connection.

Figure 4:
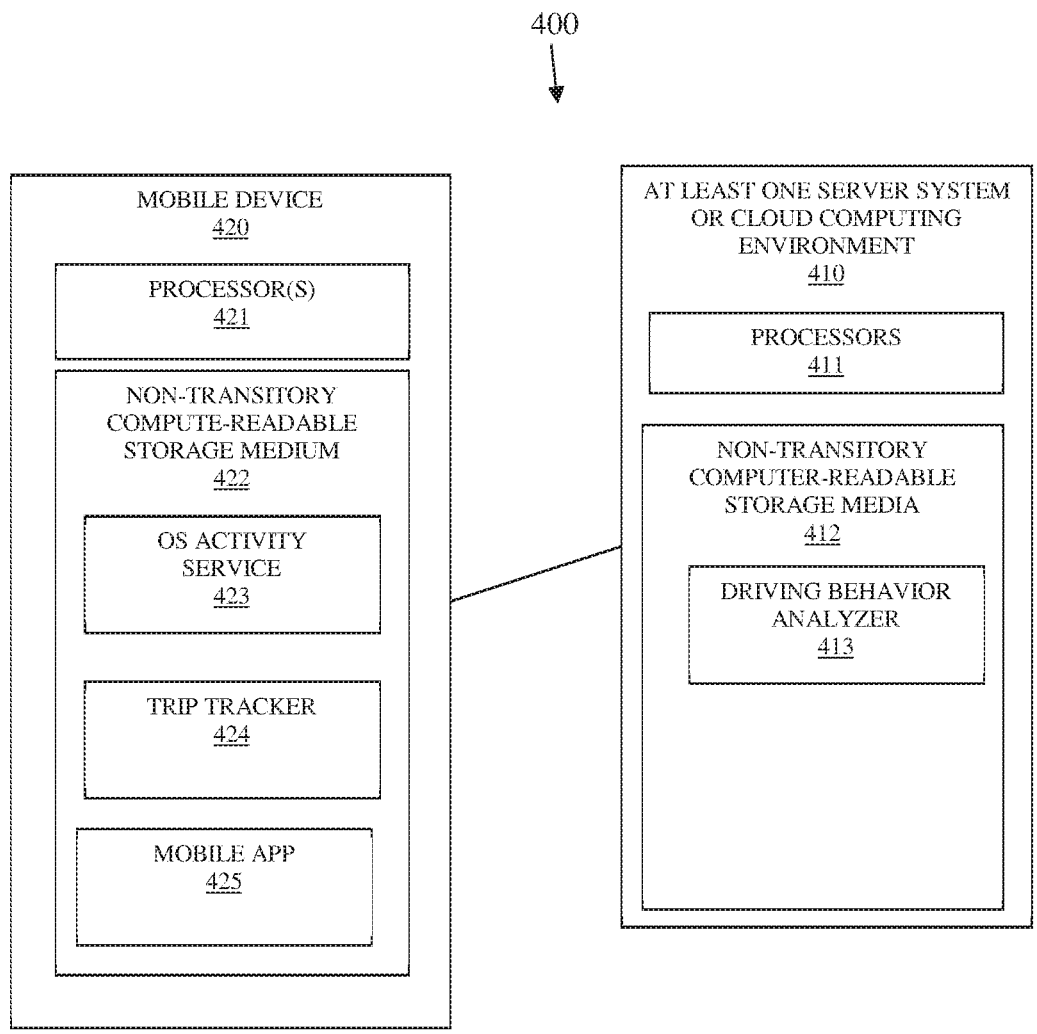
FIG. 4 is a diagram of another system for passively capturing and monitoring device behaviors, according to an example embodiment.

FIG. 4 is a diagram of another system 400 for passively capturing and monitoring device behaviors, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 100 includes: a cloud processing environment 410 (or at least one server system) comprising processors 411 and a non-transitory computer-readable storage media 412. The media 412 comprising executable instructions representing a driving behavior analyzer 413.

The system 100 also includes a mobile device 420 comprising one or more processors 421 and a non-transitory computer-readable storage medium 422. The media 422 comprising executable instructions representing an OS activity service 423 and a trip tracker 424.

The trip tracker 424 when executed by processor 421 from media 422 causes the processor 420 to performing operations comprising: 1) passively monitoring the OS activity service 423 for an alert indicating the mobile device 420 has changed locations by a configured distance; 2) actively requesting activity identifiers for activities associated with the mobile device 420 from the OS activity service 423; 3) recording sensor data from sensors of the mobile device 420 when a particular activity identifier matches a predefined activity; 4) setting a timer when a reported activity identifier from the OS activity service 423 fails to match the predefined activity; 5) recording new sensor data obtained from the sensors in the trip file during a period of time associated with the timer; 6) terminating recording of the new sensor date when there are no matching reported activity identifiers from the OS activity service 423 to the predefined activity during the entire period of time of the timer; and 7) sending the trip file to the driving behavior analyzer when the mobile device 420 is detected as having wireless connection.

In an embodiment, device 420 is mobile device 110. In an embodiment, device 110 is a mobile phone, a tablet, or a wearable processing device.

In an embodiment, the trip tracker 424 is one of, all of, or some combination of: tracking manager 115, method 200, and/or method 300.

In an embodiment, the OS activity service 423 is the OS services that identify an activity associated with device 420 as discussed above with the FIG. 1 and system 100.

The driving behavior analyzer 413 when executed by processor 411 from media 412 causes the processor 411 to perform operations comprising: 1) receiving the trip file from the trip tracker of the mobile device 420; 2) tabulating metrics for driving actions from the trip file; 3) assigning values to the metrics to represent scores for driving behaviors; and 4) providing the scores for the driving behaviors as one of several inputs considered by a rate quote service for a user or driver associated with the mobile device 420.

In an embodiment, the driving behavior analyzer 413 is the trip manager 133 and the driving analysis manager 134.

In an embodiment, the non-transitory computer-readable storage medium 422 of the mobile device 420 further comprising executable instructions representing a mobile application ("mobile app") 425. The mobile app 425 when executed by processor 421 from media 422 causes the processor 421 to perform operations comprising: 1) receiving the rate quote from the rate quote service; and 2) displaying the rate quote for acceptance within a user-facing interface of the mobile application on a display of the mobile device to the user or the driver.

To illustrate the methods and systems disclosed herein, a non-limiting list of embodiments is provided here:

Example 1 is a method for passively capturing and monitoring device behaviors. An activity identifier is received from an Operating System (OS) service executing on a device. The OS matches or correlates a reference activity associated with the device. Sensor data is obtained from a sensor of the device. The sensor data is recorded on the device. A timer is set a timer when the OS service reports a different activity identifier for the device that does not match the reference activity. New sensor data is continuously recorded and stored with the sensor data on the device until the timer expires and reported activity identifiers from the OS service remain unmatched to the reference activity for a duration of the timer.

Example 2 includes example 1 and identifies the OS and an API for interacting with the OS based on an OS type associated with the device.

Example 3 includes any one of examples 1-2 and receives an alert from the OS service when a change in locations reported for the device exceeds a threshold value.

Example 4 includes any one of examples 1-3 and actively monitors the OS service for a presence of the activity identifier based on the alert.

Example 5 includes any one of examples 1-4 and obtains the sensor data from the sensor as: location data for the device, motion data for the device, orientation data for the device, magnetic field data for the device, acceleration, altitude data for the device, and rotational data for the device.

Example 6 includes any one of examples 1-5 and maintains the sensor data in a file on the device, wherein the file is associated with a unique driving trip of a user who is possession of the device, wherein the reference activity is a driving activity of the user.

Example 7 includes any one of examples 1-6 and resets the timer each time during the duration a particular reported activity identifier matches the reference activity and is followed by a next reported activity identifier that does not match the reference activity.

Example 8 includes any one of examples 1-7 and iterates back to the recording of the sensor data when a particular reported activity identifier matches the reference activity during the duration of the timer.

Example 9 includes any one of examples 1-8 and reports the sensor data to a network-based behavior analysis service when the device has a network connection.

Example 10 includes a method for passively capturing and monitoring device behaviors. A change is detected in a first location for a device to a second location for the device that exceeds a threshold distance. An OS service is monitored on the device for a reference activity associated with the device based on the change. Sensor data is obtained from a plurality of device sensors when the OS service reports the reference activity. The sensor data is recorded as trip data associated with the reference activity until the OS service fails to report the reference activity for a reference period of time. The trip data is reported as a single trip associated with the device to a trip behavior system when the device has a wireless network connection.

Example 11 includes example 10 and obtains the change as an alert from the OS service when the change exceeds the threshold distance.

Example 12 includes any one of examples 10-11 and ignores reported activities provided by the OS service associated with walking, running, and bicycling.

Example 13 includes any one of examples 10-12 and identifies the reference activity when a particular reported activity from the OS service indicates driving.

Example 14 includes any one of examples 10-13 and obtains the sensor data from the device sensors of the device associated with: location, acceleration, rotation, altitude, motion, orientation, magnetic fields, and gravity.

Example 15 includes any one of examples 10-14 and includes an OS type associated with an OS of the device with the sensor data on a file of the device, wherein the file is uniquely associated with a single trip.

Example 16 includes any one of examples 10-15 and processes the detecting of example 10, the monitoring of example 10, the obtaining of example 10, and the recording (of example 10) when the device is in an airplane mode of operation or other mode of operation that prohibits the wireless network connection from the device and delaying the reporting (of example 10).

Example 17 includes any one of examples 10-16 and processes the reporting when the device is detected as having the wireless network connection.

Example 18 includes a system for passively capturing and monitoring device behaviors. The system comprises at least one server system and a mobile device. The at least one server system comprises at least one server having at least one processor and a non-transitory computer-readable storage medium having executable instructions representing a driving behavior analyzer. The mobile device comprises a mobile device processor and a mobile device non-transitory computer-readable storage medium having executable instructions representing an Operating System (OS) activity service and a trip tracker. The trip tracker when executed by the mobile device processor from the mobile device non-transitory computer-readable storage medium causes the mobile device processor to perform operations comprising: 1) passively monitoring the OS activity service for an alert indicating the mobile device has changed locations by a configured distance; 2) actively requesting activity identifiers for activities associated with the mobile device from the OS activity service; 3) recording sensor data from sensors of the mobile device when a particular activity identifier matches a reference activity; 4) setting a timer when a reported activity identifier from the OS activity service fails to match the reference activity; 5) recording new sensor data obtained from the sensors in a trip file during a period of time associated with the timer; 6) terminating recording of the new sensor date when there are no matching reported activity identifiers from the OS activity service to the reference activity during an entire period of time associated with the timer; and 7) sending the trip file to the driving behavior analyzer when the mobile device is detected as having wireless connection. The driving behavior analyzer when executed by the at least one processor from the non-transitory computer-readable storage medium causes the at least one processor to perform operations comprising: 1) receiving the trip file from the trip tracker of the mobile device; 2) tabulating metrics for driving actions from the trip file; 3) assigning values to the metrics to represent scores for driving behaviors; and 4) providing the scores for the driving behaviors as one of several inputs considered by a rate quote service for a user or driver associated with the mobile device.

Example 19 includes example 18, wherein the mobile device is: a mobile phone, a tablet, or a wearable processing device.

Example 10 includes any one of examples 18-19, wherein the executable instructions of the mobile device non-transitory computer-readable storage medium further includes a mobile application, the mobile application when executed by the mobile device processor from the mobile device non-transitory computer-readable storage medium causes the mobile device processor to perform processing comprising: 5) receiving the rate quote from the rate quote service; and 6) displaying the rate quote for acceptance within a user-facing interface of the mobile application on a display of the mobile device to the user or the driver.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving an activity identifier from an Operating System (OS) service executing on a device, the OS service matching a reference activity associated with the device;
   obtaining sensor data from a sensor of the device;
   recording the sensor data on the device;
   setting a timer when the OS service reports a different activity identifier for the device that does not match the reference activity; and
   continuously recording new sensor data that is stored with the sensor data on the device until the timer expires and reported activity identifiers from the OS service remain unmatched to the reference activity for a duration of the timer.

2. The method of claim 1, wherein receiving further includes identifying the OS service and an Application Programming Interface (API) for interacting with the OS service based on an OS type associated with the device.

3. The method of claim 1, wherein receiving further includes receiving an alert from the OS service when a change in locations reported for the device exceeds a threshold value.

4. The method of claim 3, wherein receiving further includes actively monitoring the OS service for a presence of the activity identifier based on the alert.

5. The method of claim 4, wherein obtaining further includes obtaining the sensor data from the sensor as: location data for the device, motion data for the device, orientation data for the device, magnetic field data for the device, acceleration, altitude data for the device, and rotational data for the device.

6. The method of claim 5, wherein recording further includes maintaining the sensor data in a file on the device, wherein the file is associated with a unique driving trip of a user who is possession of the device, wherein the reference activity is a driving activity of the user.

7. The method of claim 6, wherein continuously recording further includes resetting the timer each time during the duration a particular reported activity identifier matches the reference activity and is followed by a next reported activity identifier that does not match the reference activity.

8. The method of claim 1, wherein continuously recording further includes iterating back to the recording of the sensor data when a particular reported activity identifier matches the reference activity during the duration of the timer.

9. The method of claim 1 further comprising, reporting the sensor data to a network-based behavior analysis service when the device has a network connection.

10. A method, comprising:
    detecting a change in a first location for a device to a second location for the device that exceeds a threshold distance;
    monitoring an Operating System (OS) service on the device for a reference activity associated with the device based on the change;
    obtaining sensor data from a plurality of device sensors when the OS service reports the reference activity;
    recording the sensor data as trip data associated with the reference activity until the OS service fails to report the reference activity for a reference period of time; and
    reporting the trip data as a single trip associated with the device to a trip behavior system when the device has a wireless network connection.

11. The method of claim 10, wherein detecting further includes obtaining the change as an alert from the OS service when the change exceeds the threshold distance.

12. The method of claim 10, wherein monitoring further includes ignoring reported activities provided by the OS service associated with walking, running, and bicycling.

13. The method of claim 12, wherein monitoring further includes identifying the reference activity when a particular reported activity from the OS service indicates driving.

14. The method of claim 10, wherein obtaining further includes obtaining the sensor data from the device sensors of the device associated with: location, acceleration, rotation, altitude, motion, orientation, magnetic fields, and gravity.

15. The method of claim 10, wherein recording further includes including an OS type associated with an OS of the device with the sensor data on a file of the device, wherein the file is uniquely associated with a single trip.

16. The method of claim 10 wherein reporting further includes processing the detecting, the monitoring, the obtaining, and the recording when the device is in an airplane mode of operation or other mode of operation that prohibits the wireless network connection from the device and delaying the reporting.

17. The method of claim 16, wherein processing further includes processing the reporting when the device is detected as having the wireless network connection.

18. A system, comprising:
- at least one server system comprising at least one server having at least one processor and a non-transitory computer-readable storage medium having executable instructions representing a driving behavior analyzer;
- a mobile device comprising a mobile device processor and a mobile device non-transitory computer-readable storage medium having executable instructions representing an Operating System (OS) activity service and a trip tracker;
- the trip tracker when executed by the mobile device processor from the mobile device non-transitory computer-readable storage medium causes the mobile device processor to perform operations comprising:
  - passively monitoring the OS activity service for an alert indicating the mobile device has changed locations by a configured distance;
  - actively requesting activity identifiers for activities associated with the mobile device from the OS activity service;
  - recording sensor data from sensors of the mobile device when a particular activity identifier matches a reference activity;
  - setting a timer when a reported activity identifier from the OS activity service fails to match the reference activity;
  - recording new sensor data obtained from the sensors in a trip file during a period of time associated with the timer;
  - terminating recording of the new sensor data when there are no matching reported activity identifiers from the OS activity service to the reference activity during an entire period of time associated with the timer; and
  - sending the trip file to the driving behavior analyzer when the mobile device is detected as having wireless connection;
- the driving behavior analyzer when executed by the at least one processor from the non-transitory computer-readable storage medium causes the at least one processor to perform operations comprising:
  - receiving the trip file from the trip tracker of the mobile device; tabulating metrics for driving actions from the trip file; assigning values to the metrics to represent scores for driving behaviors; and
  - providing the scores for the driving behaviors as one of several inputs considered by a rate quote service for a user or driver associated with the mobile device.

19. The system of claim 18, wherein the mobile device is: a mobile phone, a tablet, or a wearable processing device.

20. The system of claim 18, wherein the executable instructions of the mobile device non-transitory computer-readable storage medium further includes a mobile application, the mobile application when executed by the mobile device processor from the mobile device non-transitory computer-readable storage medium causes the mobile device processor to perform processing comprising:
- receiving the rate quote from the rate quote service; and
- displaying the rate quote for acceptance within a user-facing interface of the mobile application on a display of the mobile device to the user or the driver.

* * * * *

UNITED STATES PATENT AND TRADEMARK OFFICE
CERTIFICATE OF CORRECTION

PATENT NO. : 10,880,691 B1  
APPLICATION NO. : 16/669952  
DATED : December 29, 2020  
INVENTOR(S) : Devine et al.

Page 1 of 1

It is certified that error appears in the above-identified patent and that said Letters Patent is hereby corrected as shown below:

In the Claims

In Column 13, Line 55, in Claim 1, delete "sevice" and insert --service-- therefor In Column 16, Line 16, in Claim 18, after "device;", insert a linebreak In Column 16, Line 17, in Claim 18, after "file;", insert a linebreak Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*